United States Patent Office 3,398,110
Patented Aug. 20, 1968

3,398,110
WAXY COPOLYMERS, USEFUL IN POLISH COMPOSITIONS, AND CONTAINING PENDANT CARBOXYLIC AND ESTER GROUPS
Gustave J. Klein, Great Neck, and William P. O'Rourke, Babylon, N.Y., assignors to Knomark, Inc., Springfield, Gardens, N.Y., a corporation of New York
No Drawing. Filed Oct. 23, 1965, Ser. No. 504,100
9 Claims. (Cl. 260—33.4)

ABSTRACT OF THE DISCLOSURE

Film-forming polymers and liquid self-polishing compositions containing the same, said polymers comprising a hydrocarbon chain portion and carboxylic acid groups pendant therefrom, which groups are partially esterified with a monohydric alcohol having at least 22 carbon atoms.

---

The present invention relates to certain film-forming polymers and to compositions, suitable for polishing materials such as wood or leather, containing said polymers. In particular, this invention relates to certain polymers which form self-polishing films and to polish compositions containing these materials.

According to the present invention, it has been found that certain synthetic polymers having a plurality of dependent ester groups thereon are cast from solvents to form self-polishing films having waxy characteristics. In particular, the polymers of the invention comprise a hydrocarbon backbone having pendant ester groups thereon, or pendant acid and ester groups. In these polymers, the acid portion of the pendant ester groups is bonded to the hydrocarbon backbone and the alcohol portion of the ester is a long straight chain alcohol having at least 22 carbon atoms, preferably as high as 36 carbon atoms. The polymers are soluble in most organic solvents, including ketones, esters, chlorinated hydrocarbons, mineral spirits, benzene, toluene, and other aliphatic, aromatic, and araliphatic solvents. They are insoluble in highly polar solvents such as water and alcohols.

The film-forming polymers of the invention can be prepared by esterification of an acid prepolymer, or by the addition polymerization of unsaturated ester monomers. For example, in one embodiment of the present invention, a prepolymer comprising acid groups, e.g. a copolymer of styrene and maleic acid anhydride, is reacted with a long chain alcohol to convert the prepolymer to a polymer having a plurality of ester groups. In another embodiment according to the present invention, unsaturated esters of the long chain alcohols, e.g. acrylates and methacrylates of the alcohols, are prepared and then polymerized to form the film-forming polymers of the invention.

The conversion of styrene-maleic acid anhydride or ethylene-maleic acid anhydride polymers into corresponding polymers having ester groups by reaction with an alcohol is known in the art, as is the polymerization of acrylate and methacrylate esters to form polymers having a plurality of dependent ester groups. However, unless the alcohol portion of the ester groups in the polymers has a chain length of at least 22 carbon atoms, i.e. is behenyl alcohol or higher, the polymers are brittle resins or fatty substances which do not have the properties observed in the polymers of the present invention. Generally, the longer the chain of the alcohol in such polymers having a plurality of pendant ester groups, the greater is the waxy character of the polymers. If the chain falls below $C_{22}$, fatty materials unsuitable for use as polishes are obtained.

To prepare the polymers of the invention from a prepolymer, the long chain alcohol, which is usually a solid melting above room temperature, is conveniently liquefied and combined with the acid prepolymer. The mixture is then reacted by refluxing until homogeneity is observed.

If the proceeding from ester monomers, such as the acrylates or methacrylates of $C_{22}$ or higher alcohols, the monomers are conveniently polymerized in a solvent in the presence of a free radical catalyst such as an organic peroxide or azo compound. The ester monomer, comprising an alcohol portion having a long chain, is conveniently prepared by transesterification of esters of lower alcohols, such as the methyl or ethyl esters. Because the polymerization rate of long chain ester monomers is very slow, it is preferred that the esters be copolymerized with other more reactive vinylidene compounds.

The resulting final products can be characterized as comprising a hydrocarbon chain backbone which is generally aliphatic, and may have pendant aliphatic or aromatic hydrocarbon groups thereon. Interspersed along the chain are pendant ester groups or acid and ester groups. The products are film-forming materials which can be substituted conveniently for natural waxes in many polish compositions. However, in contrast to the natural waxes, the polymers of the present invention are quite soluble in common organic solvents in fairly large amounts.

According to a further embodiment of the present invention, the polymers of the invention may be internally plasticized by incorporation of lanolin alcohols into the polymer by reaction with acid groups present to form esters. For example, when preparing the polymers of the invention by reaction of $C_{24}$ or higher alcohols with a prepolymer, a portion of the alcohols may be replaced with lanolin alcohols to give a plasticized product. Generally, the solids of the invention are amber solids having a melting point of about 100° C.–150° C. which are brittle or friable in bulk. The introduction of lanolin alcohol ester groups into the product reduces the friability giving products which form somewhat more flexible films.

In general, lanolin alcohols, which are prepared by saponifying lanolin and which comprise mixed aliphatic and aromatic alcohols, particularly sterols such as cholesterol, are incorporated into the polymers of the invention in amounts up to about ¼ the weight of the long chain alcohol present. While the addition of lanolin ester groups into the polymer does not affect the self-polishing qualities of films of the polymer, large numbers of lanolin ester groups in the polymer will result in an undesirable lowering of the softening point of the polymer.

Polish compositions incorporating the film-forming polymers of the invention are obtained simply by dissolving the polymers of the invention in a suitable solvent. In general, for film formation it is desirable to employ a solvent mixture in which the components are of different volatility. This assures a gradual drying of deposited films of the polish, which promotes the formation of bright-drying coatings. Mineral spirits, which comprise a mixture of solvent materials of different boiling point, are ideal solvents for the formulation of polish compositions using the polymers of the invention.

Particularly good polish compositions can be obtained by dispersing the film-forming solids of the present invention in volatile materials useful as aerosol propellants, suitably together with less volatile solvent materials encouraging gradual drying of a film of the solid. In aerosol polishes of this type, the polymer solid suitably comprises from 3 to 5 percent by weight of the final composition, hydrocarbon solvents for the polymer may comprise from 20 to 50 percent by weight of the final composition, and the balance is the more volatile propellant. Compositions useful as shoe polishes may additionally contain small amounts of dyes, such as brown or black oil-soluble azo dyes, conventional in the art of shoe polish formulation.

The solvent-propellant combination can be varied in the nature of the components and in their amount, as largely determined by the drying characteristics desired in the final product. Preferably, films formed from an aerosol composition should be dry to the touch within three minutes after spraying. Some "delay time" in drying is required in order to achieve formation of a glossy film. This discourages merely dispersing the film-forming polymers in the highly volatile propellant. As mentioned earlier, although pure solvent materials such as benzene can be employed as more slowly evaporating solvents, mixtures of solvents of different boiling points are preferred to encourage film coalescence. In general, the boiling point range of the less volatile solvents used is from 200° C.–300° C. Materials having a still higher boiling point can be employed, but the proportion of relatively fast-drying propellant in the final mixture is then preferably increased. In any event, the mixture should not contain non-volatile ends which would tend to persist and make the resulting films tacky.

If the polymer solids incorporated in the polish compositions of the invention do not contain an internal plasticizer such as the lanolin alcohol ester groups mentioned earlier, plasticizing substances may be added to the polish composition. For this purpose, again, the lanolin alcohols have proved particularly desirable. If present, the lanolin alcohols suitably comprise from 10 to 30 percent by weight of the total solids present in the polish composition.

Suitable volatile liquid or liquefied propellants adaptable for use in formulating aerosol compositions according to the invention are well known in the aerosol art. These materials are generally fluorinated, chlorinated, or fluorochlorinated saturated lower aliphatic hydrocarbons, or liquefied petroleum gases. Suitably halogenated lower alkanes containing 1 to 4 carbon atoms, preferably 1 or 2 carbon atoms, and at least one fluorine atom, are often generically referred to as "fluorohydrocarbon propellants," and are commercially available under the trade names "Freons," "Genetrons," "Ucons," etc. These materials include such particularly useful propellants as dichlorodifluoromethane ("Freon 12"), dichlorotetrafluoroethane ("Freon 114"), trichloromonofluoromethane ("Freon 11"), and octafluorocyclobutane ("Freon C–318"). Other examples of suitable propellants are ethyl chloride, 1,1,1-trichloroethane, butane, isobutane, propane, etc.

The propellants or suitable mixtures thereof (which mixtures are also referred to herein simply as "propellants"), suitably produce a desirable vapor pressure for the polish compositions between about 15 and about 60 lbs./sq. in. at room temperature (20–25° C.), preferably between about 20 and about 40 lbs./sq. in. at these temperatures. A combination of propellants particularly suitable for use in the present invention comprises a mixture of about equal parts by volume of "Freon 12" and "Freon 11." However, it is to be understood that individual "Freons" or mixtures of "Freons" can be employed in the invention in various amounts with the other ingredients mentioned before so that the resulting mixtures preferably have a pressure within the limits recited.

A better understanding of the present invention and of its many advantages will be had by referring to the following specific examples given by way of illustration.

Example 1

75 grams of 90–95 percent tetracosyl alcohol, commercially available under the trade name "Alfol 24," were melted in a reaction flask, and the temperature of the alcohol was raised to about 100° C. About 100 grams of a powdered 1:1 copolymer of styrene and maleic acid anhydride having an acid number of 500 were gradually added and dispersed in the alcohol with agitation. Over a period of one hour, the temperature of the reaction mixture was raised to 250° C., after which the mixture was refluxed at this temperature for an additional hour until the contents of the flask appeared homogeneous. An amber waxy solid having a melting point of about 130° C. was obtained by cooling the reaction flask.

The proportions of alcohol and acid prepolymer employed are such that approximately 25 percent of the total number of acid groups available in the prepolymer are reacted with ester formation.

The styrene-maleic acid copolymer employed in this example is one of a preferred class of resins containing styrene copolymerized with maleic anhydride in a molar ratio between about 1:1 and about 3:1. The materials are commercially available from Texas Butadiene and Chemical Corporation under the trade names "SMA 1000A," "2000A," and "3000A." The materials, which contain acid anhydride groups, have a molecular weight between about 1400 and about 2500, usually between about 1600 and about 2200, and contain on the average about 8 repeating units each comprising a maleic anhydride group and one, two or three styrene molecules in conjunction therewith.

These polymeric acid anhydride materials are solids whose melting points vary from about 140° C. to about 180° C., and are water-insoluble materials. For the purposes of the present invention, those acid materials containing styrene and maleic anhydride copolymerized in about a 1:1 ratio are preferred. These materials are physically the hardest, and have the highest melting point.

Similar products can be prepared using ethylene-maleic acid anhydride copolymers of the same type, or by employing alcohols such as behenyl or carnaubyl alcohol.

Example 2

A clear aerosol polish composition was prepared by dissolving 8 grams of the waxy product of Example 1 and 2 grams of lanolin alcohol in 40 grams of a low-flash naphtha having a KB value of 34 to give a solution containing 20 percent by weight of the solids. (If colored polishes, such as shoe polishes, are to be prepared, from 2.5 to 5 grams of an oil-soluble brown or black dye are also dissolved in the solution.)

45 grams of the resulting wax solution were then combined with 105 grams of a 50:50 by volume mixture of trichloromonofluoromethane ("Freon 11") and dichlorodifluoromethane ("Freon 12").

If desired, the lanolin alcohols may be omitted from the polish formulation, in which case the amount of film-forming ester polymer is suitably increased correspondingly.

Other solvents than the naphtha specifically mentioned can be employed, e.g. a petroleum distillate boiling between 200°–210° F. commercially available under the trade name "Isopar C."

Example 3

An internally plasticized copolymer having a plurality of ester groups therein was prepared by first melting a mixture of 100 grams of tetracosyl alcohol and 25 grams of lanolin alcohol. 100 grams of a 1:1 styrene maleic acid anhydride copolymer as in Example 1 were then dispersed in the melted alcohols, and the mixture was heated at 250° C. until homogeneous. The product was obtained on cooling the reaction mixture.

Example 4

10 grams of the film-forming product of Example 3 were dissolved in 400 grams of mineral spirits. (Optionally from 2.5 to 5 grams of oil-soluble dyes or stains may be included in the solution.) 45 grams of the resulting concentrate were mixed with 105 grams of a 50:50 by volume mixture of "Freon 11" and "Freon 12" for the formation of an aerosol shoe polish.

Example 5

350 grams (1 mol) of tetracosyl alcohol were combined with 98 grams (1 mol=2 equivalents) of maleic acid anhydride. The mixture was heated to 100° C. and maintained at 95°–100° C. until homogeneous.

The resulting product, which is a maleic acid half-ester of the $C_{24}$ alcohol, was dissolved in mineral spirits. An at least stoichimetric amount of a vinylidene comonomer, such as vinyl acetate, styrene, methyl acrylate, or methyl methacrylate, was added to the resulting solution at a temperature of about 80° C. Finally, about ½ to 1 percent, by weight of the total solids, of a peroxide initiator were added. An exothermic polymerization immediately resulted with an increase in viscosity of the solution.

The resulting polymer solution was employed in the formulation of polish compositions after appropriate dilution, with or without combination with volatile propellants.

The maleic acid half-ester prepared according to this example is quite difficult to homopolymerize, because of a slow reaction rate. Accordingly, the material is preferably copolymerized with one or more more reactive vinylidene monomers, such as lower acrylates or methacrylates, styrene, vinyl acetate, etc. In each case, an amount of comonomer sufficient to react with all the slow-reacting maleate ester is suitably employed, i.e. at least a stoichiometric amount is used. The comonomer may, however, also be used in excess. Thus, up to 1000 grams of vinyl acetate have been reacted with approximately 450 grams of the maleic acid half-ester produced according to the present example, which corresponds to a fifteen-fold stoichiometric excess of vinyl acetate. As catalysts for these polymerizations, the common free radical-forming polymerization catalysts such as the organic peroxides and azo compounds may be employed, e.g. benzoyl peroxide, t-butyl hydroperoxide, azo-bis-isobutyronitrile, etc.

If desired, products prepared according to the process of this example can be plasticized by including, as a tertiary comonomer in the polymerization, an unsaturated ester monomer formed between an unsaturated acid and lanolin alcohols. Alternatively, lanolin alcohols may be mechanically combined with the waxy polymers of the example for plasticizing purposes.

We claim:

1. A partially esterified film-forming copolymer of maleic acid anhydride and styrene or ethylene having a hydrocarbon chain portion and a plurality of carboxylic acid groups pendant therefrom, about 25 to 50 percent of which are esterified with at least one monohydric alcohol having at least 22 carbon atoms.

2. A polymer as in claim 1 wherein said copolymer is a copolymer of styrene and maleic acid anhydride and is partially esterified with tetracosyl alcohol.

3. A polymer as in claim 1 wherein said copolymer is a copolymer of styrene and maleic anhydride and is partially esterified with a mixture of tetracosyl alcohol and lanolin alcohols.

4. A liquid composition forming self-polishing waxy films on drying, said composition comprising a film-forming copolymer as in claim 1 dissolved in a solvent therefor, said solvent being volatile at room temperature.

5. A liquid composition as in claim 4 wherein said copolymer is a copolymer of styrene and maleic acid anhydride and is partially esterified with tetracosyl alcohol.

6. A liquid composition as in claim 4 wherein said copolymer is a copolymer of styrene and maleic acid anhydride and is partially esterified with a mixture of tetracosyl alcohol and lanolin alcohols.

7. A composition as in claim 4 wherein said solvent is a solvent mixture comprising a plurality of fractions of different volatility.

8. A composition as in claim 4 wherein said solvent is a solvent mixture including at least one liquefied propellant which is gaseous at room temperature and atmospheric pressure.

9. A composition as in claim 4 including lanolin alcohols dissolved in said solvent as a plasticizer for said film-forming copolymer.

References Cited

UNITED STATES PATENTS

| | | | |
|---|---|---|---|
| 2,676,934 | 4/1954 | Butler | 260—78.5 |
| 2,913,437 | 11/1959 | Johnson | 260—33.8 |
| 2,957,838 | 10/1960 | Mills. | |
| 3,085,986 | 4/1963 | Muskat | 260—33.4 |
| 3,249,592 | 5/1966 | Blades et al. | |

FOREIGN PATENTS 670,977  9/1963  Canada.

MORRIS LIEBMAN, *Primary Examiner.*

L. T. JACOBS, *Assistant Examiner.*